United States Patent [19]

Grochowski

[11] Patent Number: 5,581,718
[45] Date of Patent: Dec. 3, 1996

[54] METHOD AND APPARATUS FOR SELECTING INSTRUCTIONS FOR SIMULTANEOUS EXECUTION

[75] Inventor: Edward Grochowski, San Jose, Calif.

[73] Assignee: Intel Corporation, Santa Clara, Calif.

[21] Appl. No.: 276,089

[22] Filed: Jul. 15, 1994

Related U.S. Application Data

[63] Continuation of Ser. No. 831,968, Feb. 6, 1992, abandoned.
[51] Int. Cl.[6] .............................. G06F 9/30; G06F 13/00
[52] U.S. Cl. ......................... 395/382; 395/800; 395/380
[58] Field of Search ....................................... 395/775, 375

[56] References Cited

U.S. PATENT DOCUMENTS

| | | | |
|---|---|---|---|
| 4,236,206 | 11/1980 | Strecker et al. | 395/375 |
| 4,502,111 | 2/1985 | Riffe et al. | 395/775 |
| 5,113,515 | 5/1992 | Fite et al. | 395/425 |
| 5,179,680 | 1/1993 | Colwell et al. | 395/425 |
| 5,202,967 | 4/1993 | Matsuzaki et al. | 395/375 |

*Primary Examiner*—Jack B. Harvey
*Assistant Examiner*—Jigar Pancholi
*Attorney, Agent, or Firm*—Blakely, Sokoloff, Taylor & Zafman

[57] ABSTRACT

A method and apparatus for selecting instructions from a sequence of undifferentiated bytes of instruction data is described. A first plurality of sequential bytes of instruction data is selected from the sequence of undifferentiated bytes of instruction data. A second plurality of sequential bytes of instruction data beginning at any selected byte in the first plurality is selected from the first plurality of sequential bytes of instruction data. A third plurality of sequential bytes of instruction data beginning at any selected byte in the second plurality is selected from the second plurality of sequential bytes of instruction data. The second plurality of sequential bytes is of sufficient length to provide instruction data for at least two clock cycles.

23 Claims, 3 Drawing Sheets

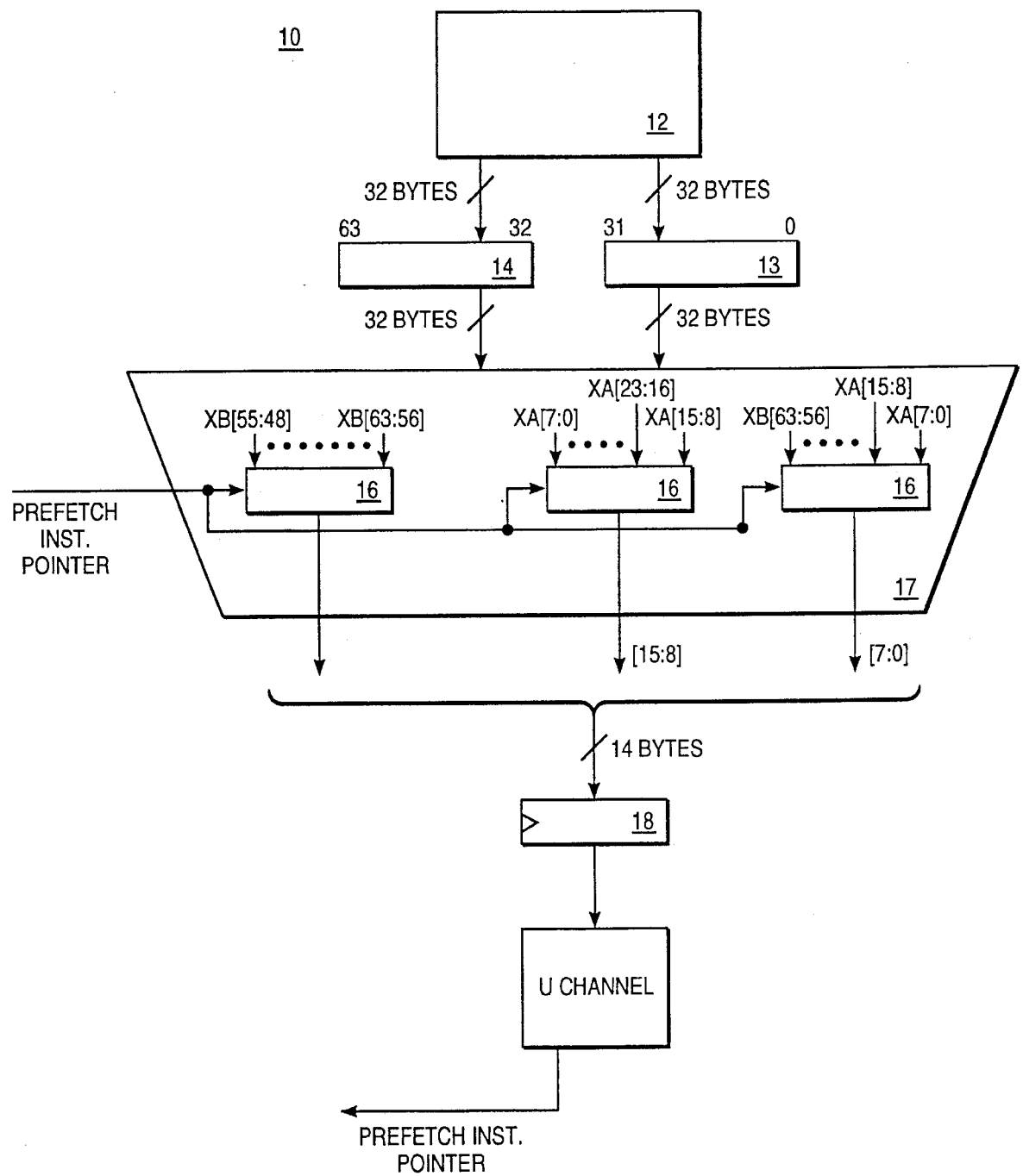
FIG_1

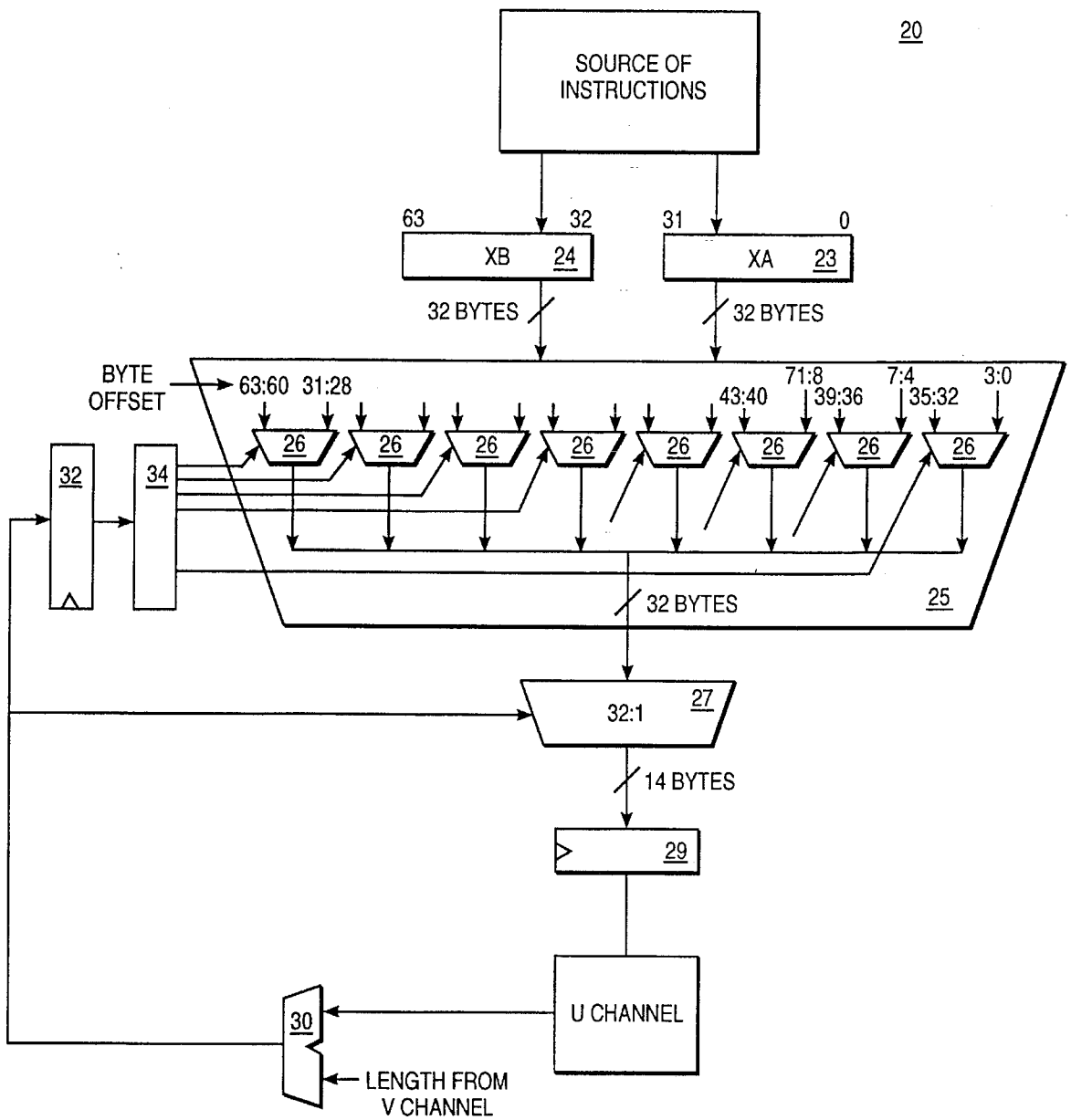
FIG_2

OUTPUT OF MULTIPLEXOR 25

| DELAYED PREFETCHPOINTER | 0110 | 0110 | 0101 | 0100 | 0011 | 0010 | 0001 | 0000 |
|---|---|---|---|---|---|---|---|---|
| 0000 | A | A | A | A | A | A | A | A |
| 0001 | A | A | A | A | A | A | A | B |
| 0010 | A | A | A | A | A | A | B | B |
| 0011 | A | A | A | A | A | B | B | B |
| 0100 | A | A | A | A | B | B | B | B |
| 0101 | A | A | A | B | B | B | B | B |
| 0110 | A | A | B | B | B | B | B | B |
| 0111 | A | B | B | B | B | B | B | B |
| 1000 | B | B | B | B | B | B | B | B |
| 1001 | B | B | B | B | B | B | B | A |
| 1010 | B | B | B | B | B | B | A | A |
| 1011 | B | B | B | B | B | A | A | A |
| 1100 | B | B | B | B | A | A | A | A |
| 1101 | B | B | B | A | A | A | A | A |
| 1110 | B | B | A | A | A | A | A | A |
| 1111 | B | A | A | A | A | A | A | A |

FIG_3

| | 28 | 24 | 20 | 16 | 12 | 8 | 4 | 0 |
|---|---|---|---|---|---|---|---|---|
| CLOCK 1 | A | A | A | A | A | A | A | A |
| | | | | | | 14 BYTES | | |
| CLOCK 2 | A | A | A | A | A | A | A | A |
| CLOCK 3 | A | A | A | A | A | A | B | B |
| CLOCK 4 | A | A | A | A | B | B | B | B |
| CLOCK 5 | A | A | A | A | B | B | B | B |
| CLOCK 6 | A | A | B | B | B | B | B | B |

FIG_4

METHOD AND APPARATUS FOR SELECTING INSTRUCTIONS FOR SIMULTANEOUS EXECUTION

This is a continuation of application Ser. No. 07/831,968, filed Feb. 6, 1992 now abandoned.

BACKGROUND OF THE INVENTION

1. Field of the Invention

This invention relates to computer processors and, more particularly, to methods and apparatus for providing instructions from a stream of sequential instructions of variable lengths which are not differentiated one from another.

2. Description of the Related Art

Computer designers are continually attempting to make computers run faster. One way in which this may be accomplished is to make the computer process instructions faster. Typically, a computer processor handles the instructions of any process in sequential order, one after another. Thus, instruction one must be processed or at least begun before instruction two can start. If two or more instructions can be run simultaneously, the computer will be able to process instructions faster. This may be accomplished by providing more than one processing path or channel for the instructions handled by the computer and running the processing paths simultaneously so that more than one instruction is being run at the same time. A computer having a processor with two or more processing paths which are capable of simultaneously processing the same type of general machine instructions which are normally run serially is called a super scaler computer.

If any new computer is to be commercially successful, it must have a base of application programs which it can run when it is introduced in order to be of interest to users. The most economic way to provide such programs is to design the new computer to operate with the application programs designed for an earlier computer or family of computers. This type of design is exemplified by the computers based on the microprocessors manufactured by Intel Corporation including the 8086, 8088, 80286, i386™, and i486™ hereinafter referred to as the Intel microprocessors.

For any new processor to function with software used by older computers, the new machine must be able to understand and process the instructions of that software. The instructions used in the Intel microprocessors line of processors vary in length from one byte to fifteen bytes. These instructions are arranged in existing programs for the Intel microprocessors to be manipulated in the typical sequential order discussed above.

One way in which the speed of computers is increased is by pipelining instructions. Instead of running each instruction until it is completed and then commencing the next instruction, the stages of an instruction are overlapped so that no part of the computer lies idle while another stage is being accomplished. The computers using the Intel microprocessors pipeline instructions so that each stage of the operation may be handled in one clock period. In general, this requires that an instruction be fetched from wherever it is stored, be decoded, be executed, and then the results of the execution be written back to storage for later use. The circuitry is designed so that the different stages each require one clock period. Different portions of the processor accomplish each of the stages in the pipeline on sequential instructions during each clock period. Thus, during a first clock period the prefetch portion of the processor fetches an instruction from storage and aligns it so that is ready for decoding. During a second clock period the prefetch portion of the processor fetches the next instruction from storage and aligns it so that is ready for decoding in the third clock period. A decoder portion of the processor accomplishes the decoding of the first instruction fetched during the second clock period. The decoder portion of the processor accomplishes the decoding of the second instruction fetched during the third clock period. By pipelining instructions the overall speed of operation is significantly increased.

The instructions are furnished on the bus or from a cache memory as a stream of bytes in which no instruction is differentiated from any other. Each instruction (in general) appears in order in any process. These instruction must be prefetched from the cache memory in one clock period. Since the instructions vary in length, a second instruction cannot be prefetched unless the length of the first instruction is known. In order to determine the length of an instruction being processed at any time, previous computers using the Intel microprocessors first decode the instruction to determine its content. When this has been accomplished, the length of the instruction being processed and the starting point for the next instruction in sequence are known and can be fed back to the prefetch unit. This has forced the decoding of instructions in all previous computers based on the Intel microprocessors to be conducted serially.

Since a super scaler machine must process at least two instructions simultaneously, it must decode two instructions simultaneously. However, to select the correct bytes of code for a second instruction, it must know where a first instruction ends so that it may know where the next (second) instruction begins. Yet only by decoding the first instruction can it know the length of the first instruction and, thus, where the second instruction begins. The entire purpose of the super scaler to process two instructions at the same time is thwarted if the processing of the second instruction must await the decoding of the first instruction before it can begin.

An arrangement for determining the ends of individual instructions in a stream of instructions is described in U.S. patent application Ser. No. 07/831,942, entitled *End Bit Markers For Instruction Decode*, E. Grochowski et al, filed Feb. 6, 1992, now abandoned and assigned to the assignee of the present invention. One of the problems encountered in designing the arrangement of this patent application was to provide an arrangement for deriving from the stream of instruction data available a sufficient amount of data to include the two sequential instructions which are to be processed by the two channels of the super scaler processor while maintaining the speed of the operation of the computer. In general, sixty-four bytes of data from which the selection is to be made are available at each clock. The selection requires the generation of an instruction pointer from the first of the two sequential instructions in order to accomplish the selection of the next instructions from the sixty-four bytes in the next clock period using very large multiplexors. It is just possible to generate an instruction pointer within the time limits of the clock. However, to use this value to select the next instructions using 64-to-1 multiplexers has proven to be impossible because of the very large capacitive loading created by the switches in the multiplexors which are not operated. Consequently, prior art selection techniques will not allow the selection of the appropriate instructions for use by the two processor channels of the super scaler machine.

SUMMARY OF THE INVENTION

It is, therefore, an object of the present invention to provide apparatus for selecting instructions from a stream of instructions of varying lengths.

It is another more specific object of the present invention to provide apparatus for accelerating the process of multiplexing instruction data from a large amount of such data.

These and other objects of the present invention are realized in a circuit for selecting a plurality of instructions from a sequence of undifferentiated bytes of instruction data comprising means for providing a first plurality of sequential bytes of instruction data from the sequence of undifferentiated bytes of instruction data; means for selecting from the first plurality of sequential bytes of instruction data a second plurality of sequential bytes of instruction data beginning at any selected byte in the first plurality of sequential bytes of instruction data; and means for selecting a third plurality of sequential bytes of instruction data from the second plurality of sequential bytes of instruction data beginning at any selected byte of the second plurality of sequential bytes of instruction data, the third sequence of bytes being one-half or less in length than the second sequence and being completed within the second sequence of bytes.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a block diagram of a circuit arrangement designed in accordance with the prior art.

FIG. 2 is a block diagram of a circuit arrangement designed in accordance with the present invention.

FIG. 3 is a diagram illustrating different signal conditions useful in understanding the present invention.

FIG. 4 is another diagram illustrating different signal conditions useful in understanding the present invention.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to an apparatus for operating a computer in processing electrical or other (e.g. mechanical, chemical) physical signals to generate other desired physical signals.

DETAILED DESCRIPTION OF THE INVENTION

Referring now to FIG. 1, there is illustrated a block diagram of a circuit 10 constructed in accordance with the prior art which may be utilized to understand the problems faced in implementing the present invention. The circuit 10 is designed to select two sequential instructions from among a larger plurality of instructions being processed by a computer. These instructions are not differentiated from one another and vary in length. In the preferred embodiment of the invention, the individual instructions are selected from a group of sixty-four bytes which are held in serial byte order in two thirty-two byte lines of an instruction cache associated with the processor. Instructions might also be similarly selected from a computer bus or from other sources which present such instructions in serial order. In the preferred embodiment of the invention, the individual instructions may vary from one to fifteen bytes. However, even though individual instructions may be as long as fifteen bytes, no instruction which may be run simultaneously with another instruction is longer than seven bytes.

The typical method of accomplishing such a selection and rotation is illustrated in FIG. 1. The instruction data in a first line of a cache memory 12 is furnished to a first buffer 13 (A) and the instruction data in a second adjacent line of the cache memory 12 is furnished to a second buffer 14 (B). In the preferred embodiment, each of these buffers is thirty-two bytes wide so that a total of sixty-four sequential bytes of instruction data from two lines of an instruction cache is available from which the two instructions desired may be selected. The bytes of the instructions in the buffers 13 and 14 are individually available to the input terminals of a plurality (fourteen) of 64-to-1 multiplexors 16 which select the bytes which make up the two individual serial instructions desired. One byte is selected by each of the plurality of multiplexors 16 to provide a total of fourteen bytes of instruction data, the number of bytes required for two of the longest instructions used together (seven bytes each) in the machines for which the invention is designed. By selecting from two cache lines which include sequential bytes of instructions to fill the buffers 13 and 14, instructions which wrap around the end of cache lines may be processed as rapidly as instructions found in the middle of cache lines. The multiplexors 16 are together referred to as a rotator 17. The circuit 17 is referred to as a rotator because it is used to select two sequential instructions from the larger number of instructions in the buffers 13 and 14 and to transfer and align those instruction in a latch 18 from which they may be individually transferred for decoding and processing by two processing channels of a super scaler machine. It also allows instructions to be selected which cross over and wrap around the end of cache lines to the next cache line.

The byte of instruction data selected by the first in sequence of the fourteen multiplexors 16 is selected using a six bit value derived from the instruction pointer. The byte selected by the remaining multiplexors 16 are chosen using values each incremented by one from the first value; each succeeding values is used to select the next sequential input byte from the buffers 13 and 14 so that a series of fourteen sequential bytes of instruction data lying in the buffers 13 and 14 are provided. Thus, a six bit value selecting byte of instructions starting at the first (0) byte in buffer 13 (A) would select that first byte using the first multiplexor 16 at the right of the rotator 17 in the figure. The six bit value incremented by one would select the second sequential byte in buffer 13 as byte two using the second multiplexor 16. The six bit value again incremented by one would select the third sequential byte in buffer 13 as byte three using the third multiplexor 16, and so on. It will be appreciated that when the first byte of the fourteen bytes selected is the first byte in the buffer 13, all of the bytes are selected from the first buffer 13 which holds thirty-two bytes. As instructions are processed and later instructions in sequence are selected, the selection will proceed through the last byte in the buffer 13 and into the bytes of instructions available in the second buffer 14 (B).

From the multiplexors 16 of the rotator 17, the bytes of the instructions are transferred to the latch 18 from which the first instruction is derived and processed by the first (U channel) channel of the super scaler processor. The first step of the processing is the decoding of the instruction. This decoding provides the prefetch instruction pointer from which the six bits are derived which accomplish the selection at the multiplexors 16. This value is derived and fed back to help select the next instruction to be derived from the buffers 13 and 14. A description of the decoding process and circuitry utilized with the preferred embodiment of this invention is included in U.S. patent application Ser. No. 07/823,881, entitled *Microprocessor With Apparatus For Parallel Execution of Instructions*, E. Grochowski, filed Jan. 23, 1992 now abandoned, and assigned to the assignee of the present invention.

It has been discovered that switching the multiplexors 16 with their 64-to-1 fan-in ratio cannot be accomplished within the single clock period allowed for each selection of a pair of instructions in the super scaler machine of which the invention is a part. This is true because only one of the sixty-four bytes available at the input to each multiplexor 16 is switched to the output by each of the multiplexors 16 while sixty-three of the bytes are not switched. The individual switching devices (N channel field effect transistor devices) associated with the inputs which are not switched to each multiplexor 16 create a capacitive load at the input to the multiplexors 16 which completely swamps switching of the gates which are turned on. This slows the switching to the point that it cannot be accomplished in the time allotted.

FIG. 2 illustrates a circuit 20 constructed in accordance with the present invention. The circuit 20 includes a pair of buffers 23 (A) and 24 (B) to which are directed sequential lines from the associated instruction cache or from some other source 22 of the stream of instructions which are to be processed. Each of the buffers 23 and 24 thus stores thirty-two bytes of instruction data in the preferred embodiment of the invention. For the purpose of this explanation the thirty-two bytes of instruction data in each buffer may be considered to be aligned from right to left in each buffer as illustrated in FIG. 2. A first 2-to-1 multiplexor 25 selects thirty-two sequential bytes of instruction data to be transferred from the sixty-four bytes of instruction data available in the two buffers 23 and 24. In the preferred embodiment of the invention, the large multiplexor 25 actually includes eight individual smaller multiplexors 26 each connected to receive as input four of the bytes stored in each of the two buffers 23 and 24. The multiplexor 26 to the right in the figure, for example, receives either the first four bytes held in the A buffer or the first four bytes held in the B buffer. The second multiplexor 26 from the right receives either the second four bytes held in the A buffer or the second four bytes held in the B buffer. The multiplexors 26 of the large multiplexor 25 each are selectable on a four byte granularity so that each transfers the selected four adjacent bytes to a next rotator 27. For example, if the first of the eight multiplexors 26 of the large multiplexor 25 were aligned on the 0 byte of the buffer 23 by control means, then the bytes 3:0 of the first buffer 23 would be transferred to the rotator 27 by that first multiplexor 26. The second multiplexor 26 of the large multiplexor 25 would transfer bytes 7:4 from the buffer 23; the third multiplexor 26 would transfer bytes 11:8 from the buffer 23; and so on with all thirty-two bytes being transferred from the buffer 23 to the rotator 27.

If as in the example the first of the thirty-two sequential bytes is the rightmost byte stored in the buffer A, then all thirty-two bytes come from the buffer A. However, as instructions are processed, the thirty-two bytes transferred by the multiplexors 26 of the multiplexor 25 change on a four byte granularity to include bytes from the buffer 24. This process is illustrated in FIG. 3 in which a series of thirty-two byte transfers from the multiplexor 25 to the rotator 27 are shown. Each line of the line illustrates thirty-two bytes of instruction data. The first in sequence of the thirty-two bytes shown in each line of the figure is the byte at the right of the rectangular window in that line. For this illustration only, the bytes transferred change in four byte increments from right to left with each step immediately below the step before it. A four byte increment is the smallest selection granularity which may be used in the preferred embodiment of the invention. Thus as the apparatus for selecting using the multiplexor 25 increments in four byte steps to the left, the "A"s indicating values from the buffer A are gradually replaced on the right by values from the buffer B. When the first four bytes have been used, for example, the next transfer of thirty-two bytes begins with bytes 7:4 transferred by the second multiplexor 26 from the right, proceeds through all of the remaining bytes held in the buffer A, and loops back to transfer the first four bytes 35:32 held in buffer B using the first multiplexor 26 to the right in the figure. Thus the multiplexor 25 transfers thirty-two bytes of instructions individual ones of which may extend from one cache line to the next. Moreover, when the selection has proceeded far enough that all thirty-two of the instruction bytes selected are entirely from the second buffer B, the first buffer A may be refilled from the next succeeding cache line or other source of data. This refill happens well before the time that data is needed. In this manner, instructions may be selected which wrap around cache lines without any delay in the selection process.

The rotator 27 is similar to the rotator which includes the multiplexors 16 of FIG. 1 except that it includes fourteen individual 32-to-1 multiplexors. Each of the multiplexors of the rotator 27 receives as input each of the individual bytes transferred by the multiplexor 25 and provides as output a single byte selected by a five bit value derived from the prefetch instruction pointer. This is accomplished in the same manner as is the operation of the rotator comprised of the multiplexors 16 in FIG. 1.

Thus, the fourteen bytes furnished by the multiplexors of the rotator 27 are furnished as aligned values to a buffer 29 and then to the U channel in which the first of the instructions is decoded. The U channel provides value for the length of the instruction being processed (called a length value) which is furnished to an adder circuit 30. This value is combined with a similar length value from the decoding of the instruction in the V channel to produce a total length value. This value defines the prefetch pointer which is used to select the next two instructions to be decoded.

By reducing the number of switches at the input to the multiplexors of the rotator 27 to thirty-two, the capacitive loading on any switch actually operated is reduced to a point that the selection may be made within the clock period available for generating the prefetch instruction pointer.

However, it is also necessary that appropriate control signals be provided for operating the multiplexor 25. Since the multiplexor 25 lies earlier in the path of the processing operation than the rotator 27, it cannot be similarly controlled by simply routing the value from the decoded prefetch instruction pointer. The prefetch instruction pointer value is simply not available early enough in the clock cycle to select the values for the multiplexor 25 so that the beginning of the byte values transferred and the first instruction coincide.

However, the size of the large multiplexor 25 is chosen in order to allow for the delay in generating the prefetch pointer. By selecting a full thirty-two bytes, the multiplexor 25 provides a sufficient window for a total of over two pairs of maximum size instructions which may be processed in pairs. Consequently, even though two complete instructions each having seven bytes have been selected on a first clock, the output of the multiplexor 25 still provides a sufficient number of bytes of instruction data to the rotator 27 to include the next two paired instructions (fourteen bytes). This provides an extra clock period for generating the prefetch pointer and allows selecting the next two instructions using the prefetch instruction pointer generated on the first clock to control the multiplexors 26 of the large multiplexor 25. Thus, the values used to select the multiplexors 26 of the large multiplexor 25 may be generated from a pointer delayed by one clock period since the size of the window of instructions furnished by the multiplexor 25 makes the operation not critical to the operation of the processing pipeline. FIG. 2 illustrates a latch 32 which stores the pointer generated for the multiplexor 25 to provide this delay and decoder circuitry 34 which accomplishes the selection of the individual multiplexors 26 in a manner well known to the prior art. By providing a sufficient width for the first multiplexor 25, the multiplexor 25 and the smaller rotator 27 may replace the single large rotator 17 of the prior art yet provide the speed increase necessary in switching the multiplexors of the rotator 27.

The operation of selecting using the multiplexor 25 and the rotator 27 may be better understood by referring to FIG. 3 which illustrates a number of steps of the selection process by which a final fourteen bytes of instruction data are selected using the circuit 20 of FIG. 2. In FIG. 3 are illustrated a series of lines each holding thirty-two bytes on instruction data. Each letter on each of the lines actually represents four individual bytes of instruction data. These lines represents the bytes transferred by the multiplexor 25 to the rotator 27 in response to each prefetch instruction pointer. The number to the left of each line represents the prefetch pointer address presented to the rotator 27 to select a beginning for a first of two instructions to be provided by the rotator 27 to the two processing channels of the processor. The rectangle on each line surrounding four letters represents the fourteen bytes of instruction data which are transferred by the rotator 27. Because each letter represents four bytes of data, the rectangle appears to include sixteen bytes but only fourteen are actually transferred by the rotator 27. The right hand edge of the rectangle represents the address specified by the instruction pointer address. An "A" represents a set of bytes from the A buffer and a "B" represents a set of four bytes from the B buffer.

Presuming a beginning point at which the multiplexor 25 selects thirty-two bytes beginning at the start of the A buffer, the multiplexor 25 provides instruction bytes entirely from the A buffer to the rotator 27. From these bytes, the rectangle represents the fourteen bytes selected by the rotator 27 (again, the rectangle includes sixteen bytes but only fourteen are actually selected). As may be seen, an additional sixteen bytes exist to the left of the rectangle from which sequential instructions may be selected in following clock periods. As the lines of instructions are viewed descending from the upper line, the address has moved by one four byte increment to the right with each line. It will be seen that as this occurs at the selection input to the multiplexor 25, the A values at the right are replaced by B values so that a full thirty-two bytes of sequential instruction data are available on each line from which the selection by the rotator 27 may be made. Ultimately, when all A values in FIG. 3 are replaced by B values, the bytes of instruction data in the buffer A are replaced by a new line including the next thirty-two sequential bytes from the instruction cache memory; and these A values begin to replace the B values beginning at the right. This illustrates the wrap around process accomplished by the multiplexor 25.

As may be seen from FIG. 3, the bytes of instruction data within the rectangle which represent the bytes selected by the rotator 27 move gradually to the left in the figure. Although single four byte changes in the amount of instruction data transferred are illustrated for each of the multiplexor 25 and the rotator 27, the pointer change would obviously vary in accordance with the length of the instructions being decoded. However, even though the pointer with which the rotator 27 selects jumps by fourteen bytes, the thirty-two bytes transferred by the multiplexor 25 are sufficient to allow this change even though the selection of bytes by the multiplexor 25 from the buffers A and B has not changed.

FIG. 4 illustrates a number of steps in the operation of the circuit 20 of FIG. 2. FIG. 4 illustrates a number on lines each of which includes from right to left all of the bytes of data transferred by the multiplexor 25 during one clock period. The lines proceed downward to indicate the bytes of data transferred by the multiplexor 25 during a number of sequential clock periods. Beginning at the right, the columns are designated from 0 to 28 in four byte increments to indicate that each transfer by the multiplexor 25 occurs at a granularity of four bytes of instruction data. At clock 1, a branch instruction provides selection values for each of the multiplexor 25 and the rotator 27. The selection value points to the first (0) byte of the A buffer as the beginning of the first byte of the two instructions to be processed simultaneously. This selection value is decoded and causes the rightmost multiplexor of the multiplexor 25 to transfer the rightmost byte from the A register to the 0 input of the rotator 27. Each of the multiplexors 26 of the large multiplexor 25 preceding to the left transfers the next four bytes in sequence from the A register to the next multiplexor of the rotator 27.

The rotator 27 receiving the pointer produced by the branch instruction selects for transfer the first fourteen bytes beginning at the right. These fourteen bytes are shown within the bracketed rectangular portion as the window of data transferred by the rotator 27. The arrow at the right of the rectangular bracket points to the byte position indicated by the selection value (pointer) driving the rotator 27.

On the next clock, the instructions transferred on the first clock to the decoders are decoded to provide the lengths of the two instructions transferred on the first clock. The two lengths are added, and the value is fed back to the selection terminal of the rotator 27 to move the selection to the point indicated by the arrow on line 2. This changes the selection of instruction bytes by the rotator 27 to encompass the window of data illustrated by the bracketed bytes. As may be seen, the arrow now points to the position at which the two instructions transferred at the last clock ended. However, since the multiplexor 25 has not yet received the delayed pointer input, the thirty-two bytes of instruction data which it transfers have not changed. Even so, as may be seen, a number of bytes of instructions are still being transferred by the multiplexor 25 which have yet to be transferred by the rotator 27 even though as many as fourteen bytes may have been transferred on the first clock.

On clock 3, the pointer at the selection terminal of the rotator 27 has moved so that the rectangular bracket includes the leftmost four bytes of instruction data on the line of data transferred by the multiplexor 25. At this point, the delayed pointer value from the decode operation of the instructions transferred on the first clock selects the data transferred by the multiplexor 25. This causes the two rightmost multiplexors 26 of the large multiplexor 25 to transfer the two rightmost bytes from the B buffer. It will be noted that the bytes of instruction data from the B buffer have yet to be transferred by the rotator 27 and remain available at the output of the multiplexor 25. An additional eight bytes from the A register which have already been transferred by the rotator 27 (indicated by the two As to the left of the Bs in clock 3) are still being transferred by the multiplexor 25. Thus, the window provided by the multiplexor 25 is still large enough to allow the proper transfer by the rotator 27.

On clock 4, it is presumed that the decoding of the instruction indicates that the pointer is not to move (for example, a stall in processing is required because of a cache miss) so that the same instruction continues to be transferred to the U channel. Thus, the pointer at the selection terminal of the rotator 27 does not move. However, the delayed pointer to the selection terminal of the multiplexor 25 now receives the value decoded from the transfer which occurred on clock 2. Consequently, the multiplexor 25 transfers additional bytes from the B buffer to fill the input positions to the immediate left of the pointer arrow.

On clock 5, the pointer to the rotator 27 moves to the left to the end of the previous bracketed data and now wraps around to the beginning of the line to include values from the B buffer at the far right of the line. The delayed pointer receives the value decoded from the transfer at clock 3, however, and does not move. At clock 6, the pointer decoded from the transfer at clock 5 moves the selection by the rotator 27 to the far right to encompass only B buffer data. The delayed value decoded from the transfer at clock 4 causes the multiplexor 25 to transfer addition bytes from the B buffer.

Thus, the illustration of the operation of the invention demonstrates that the arrangement includes a two-to-one multiplexor and the rotator 27 allows a sufficient window for the selection of the instructions to be handled by both of the channels of the super scaler while allowing the number of switches in the critical path to be reduced to a point at which the capacitive load does not inhibit switching within the required time intervals available for maintaining the two channels functioning simultaneously.

In addition to the reduction of capacitive loading at the rotator 27, an additional speed advantage provided by the arrangement of this invention is that only five bits need be generated from the decoding of the instructions in order to control the multiplexors of the rotator 27 rather than the six bits necessary to control a sixty-four byte rotator as used in the prior art. This provides somewhat more leeway in generating the control values to operate the rotator 27.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for selecting a plurality of instructions from a sequence of undifferentiated bytes of instruction data comprising:

means for providing a first plurality of sequential bytes of instruction data from the sequence of undifferentiated bytes of instruction data;

means for selecting from the first plurality of sequential bytes of instruction data a second plurality of sequential bytes of instruction data beginning at any selected byte in the first plurality of sequential bytes of instruction data by utilizing a pointer which indicates the last byte already processed; and means for selecting a third plurality of sequential bytes of instruction data from the second plurality of sequential bytes of instruction data beginning at any selected byte of the second plurality of sequential bytes of instruction data by utilizing said pointer which indicates the last byte already processed.

2. A method for selecting a plurality of instructions from a sequence of undifferentiated bytes of instruction data comprising:

receiving a first plurality of sequential bytes of instruction data from the sequence of undifferentiated bytes of instruction data;

selecting from the first plurality of sequential bytes of instruction data a second plurality of sequential bytes of instruction data beginning at any selected byte in the first plurality of sequential bytes of instruction data by utilizing a pointer which indicates the last byte already processed; and selecting a third plurality of sequential bytes of instruction data from the second plurality of sequential bytes of instruction data beginning at any selected byte of the second plurality of sequential bytes of instruction data by utilizing said pointer which indicates the last byte already processed.

3. The method of claim 2 further comprising:

generating said pointer to indicate the last byte already processed.

4. The method of claim 3 wherein generating said pointer to indicate the last byte already processed further comprises:

deriving a length value for a first instruction processed;

deriving a length value for a second instruction processed; and adding the length values.

5. The method of claim 3 wherein generating said pointer to indicate the last byte already processed further comprises:

deriving a length value for each instruction of a plurality of instructions processed in a single clock cycle; and adding the length values.

6. The method of claim 2 wherein said third plurality of sequential bytes of instruction data is of sufficient size to include a plurality of maximum size instructions that can be processed in one clock cycle.

7. The method of claim 2 wherein said third plurality of sequential bytes of instruction data is of sufficient size to include two maximum size instructions.

8. The method of claim 2 wherein said second plurality of sequential bytes of instruction data is of sufficient size to include a plurality of maximum size instructions that can be processed in two clock cycles.

9. The method of claim 2 wherein said second plurality of sequential bytes of instruction data is of sufficient size to include four maximum size instructions.

10. A method for selecting a plurality of instructions from a sequence of undifferentiated bytes of instruction data comprising:

receiving a first plurality of sequential bytes of instruction data from the sequence of undifferentiated bytes of instruction data;

selecting from the first plurality of sequential bytes of instruction data a second plurality of sequential bytes of instruction data beginning at any selected byte in the first plurality of sequential bytes of instruction data;

selecting a third plurality of sequential bytes of instruction data from the second plurality of sequential bytes of instruction data beginning at any selected byte of the second plurality of sequential bytes of instruction data;

selecting a fourth plurality of sequential bytes of instruction data from the third plurality of sequential bytes of instruction data wherein said fourth plurality of sequential bytes of instruction data comprises a first instruction; and selecting a fifth plurality of sequential bytes of instruction data from the third plurality of sequential bytes of instruction data wherein said fifth plurality of sequential bytes of instruction data comprises a second instruction.

11. A circuit for selecting a plurality of instructions from a sequence of undifferentiated bytes of instruction data comprising:

a first device which stores a first plurality of sequential bytes of instruction data from the sequence of undifferentiated bytes of instruction data;

a second device coupled to said first device which selects from the first plurality of sequential bytes of instruction data a second plurality of sequential bytes of instruction data beginning at any selected byte in the first plurality of sequential bytes of instruction data wherein said second device utilizes a pointer which indicates the last byte already processed; and a third device coupled to said second device which selects a third plurality of sequential bytes of instruction data from the second plurality of sequential bytes of instruction data beginning at any selected byte of the second plurality of sequential bytes of instruction data wherein said third device utilizes said pointer which indicates the last byte already processed.

12. The circuit of claim 11 further comprising:

a pointer generator which generates said pointer to indicate the last byte already processed.

13. The circuit of claim 12 wherein said pointer generator comprises:

a first decoder which determines a length for a first instruction processed;

a second decoder which determines a length for a second instruction processed; and an adder which adds the lengths.

14. The circuit of claim 12 wherein said pointer generator comprises:

a decoder which determines a length for each instruction of a plurality of instructions processed in a single clock cycle; and an adder which adds the lengths.

15. The circuit of claim 11 wherein said third plurality of sequential bytes of instruction data is of sufficient size to include a plurality of maximum size instructions that can be processed in one clock cycle.

16. The circuit of claim 11 wherein said third plurality of sequential bytes of instruction data is of sufficient size to include two maximum size instructions.

17. The circuit of claim 11 wherein said second plurality of sequential bytes of instruction data is of sufficient size to include a plurality of maximum size instructions that can be processed in two clock cycles.

18. The circuit of claim 11 wherein said second plurality of sequential bytes of instruction data is of sufficient size to include four maximum size instructions.

19. The circuit of claim 11 wherein said second device comprises of a multiplexor.

20. The circuit of claim 19 wherein said multiplexor comprises of a plurality of 8-to-4 mutiplexors.

21. The circuit of claim 11 wherein said third device comprises of a rotator.

22. The circuit of claim 12 wherein said rotator comprises of a plurality of 32-to-1 multiplexors.

23. An apparatus for selecting a plurality of instructions from a sequence of undifferentiated bytes of instruction data comprising:

a first device capable of storing a first plurality of sequential bytes of instruction data from the sequence of undifferentiated bytes of instruction data;

a second device coupled to said first device capable of selecting from the first plurality of sequential bytes of instruction data a second plurality of sequential bytes of instruction data beginning at any selected byte in the first plurality of sequential bytes of instruction data;

a third device coupled to said second device capable of selecting a third plurality of sequential bytes of instruction data from the second plurality of sequential bytes of instruction data beginning at any selected byte of the second plurality of sequential bytes of instruction data;

a fourth device coupled to said third device capable of selecting a fourth plurality of sequential bytes of instruction data from the third plurality of sequential bytes of instruction data wherein said fourth plurality of sequential bytes of instruction data comprises a first instruction; and a fifth device coupled to said third device capable of selecting a fifth plurality of sequential bytes of instruction data from the third plurality of sequential bytes of instruction data wherein said fifth plurality of sequential bytes of instruction data comprises a second instruction.

* * * * *